Aug. 30, 1966  M. J. LACY  3,268,986
METHOD OF MANUFACTURING DYNAMOELECTRIC MACHINES
Filed May 7, 1963
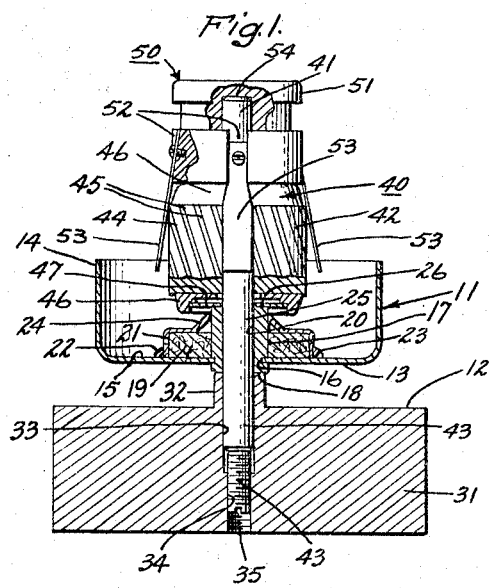
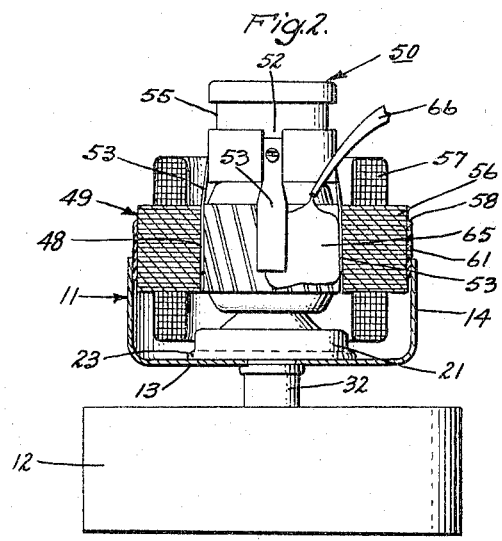
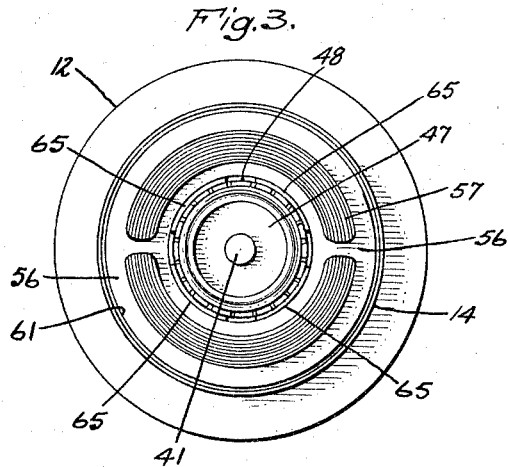
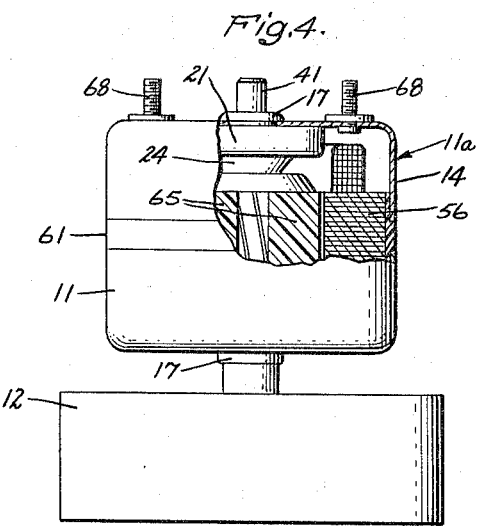
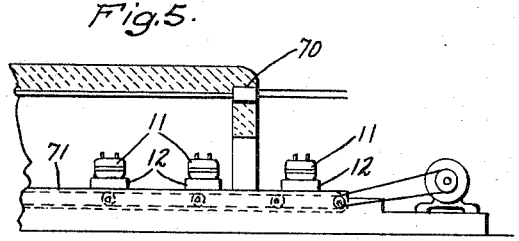
INVENTOR.
Michael J. Lacy,
BY John M. Stoudt
Attorney.

United States Patent Office 3,268,986
Patented August 30, 1966

3,268,986
**METHOD OF MANUFACTURING DYNAMO-
ELECTRIC MACHINES**
Michael J. Lacy, Florissant, Mo., assignor to General
Electric Company, a corporation of New York
Filed May 7, 1963, Ser. No. 278,656
5 Claims. (Cl. 29—155.5)

This invention relates in general to dynamolectric machines and more particularly to an improved method of manufacturing and assembling small and fractional horsepower motors especially of the totally enclosed type.

In the past considerable difficulty has been experienced during the mass production manufacture of dynamoelectric machines, especially motors and generators of the totally enclosed type of the smaller frame sizes, in achieving with any degree of consistency and economy of manufacture accurately aligned bearing and shaft components as well as a uniform air gap defined between the rotor and stator. As is well known by those skilled in the dynamoelectric machine art, extremely important and critical factors directly affecting machine performance, i.e., motor efficiency and longevity of operation, are both the degree of interference and journal friction experienced between the shaft journaling bearings and the rotor shaft built into the machine during its fabrication, and the establishment of the magnetic flux field across the rotor-stator air gap.

With respect to the alignment problem of bearings and shaft, the slightest variation, either in a coaxial relation between the internal bearing surfaces which journal the shaft on either side of the rotor or in the true parallel relation of these internal surfaces and the shaft journal surfaces which they support, will result in a cocking of the shaft and bearings relative to one another. This in turn rather drastically reduces the available journal area of contact between a cooperating surface for supporting the shaft and produces interference with freedom of shaft rotation.

As to the significance of a uniform air gap, it is well known that the strength and effectiveness of the magnetic flux field across the air gap is controlled to a great extent by the uniformity of air gap dimensions, that is, as the radial width of the air gap is decreased and maintained uniform, less magnetic material and exciting coils are required to produce a given field strength and machine performance.

These problems are greatly magnified in the fabrication of totally enclosed motors where the end shields are usually imperforate and ready access to the internal motor components is impractical. Therefore it is very desirable to provide an improved yet low cost method of manufacture which is capable of providing proper alignment between the shaft and bearings, and an accurately controlled air gap into the machine, especially where the machine is of the totally enclosed type in which the internal components of the machine are inaccessible once the machine components have been assembled in final relation.

Accordingly, it is a general object of the invention to provide an improved method of manufacturing dynamoelectric machines, and a more specific object is the provision of a method of manufacture which achieves the desirable features mentioned above.

It is a further object of the invention to provide a method of manufacturing dynamoelectric machines which provides a high degree of control and accuracy in the air gap between the rotor and stator and in the alignment between the bearings and shaft even though the air gap is inaccessible once the motor components have been disposed in their finally assembled relation.

In carrying out the objects of the present invention in one form thereof, I provide an improved method of manufacturing a dynamoelectric machine, especially suitable for fabricating machines of the totally enclosed type. Initially, I arrange and temporarily maintain the rotor and shaft assembly and the stator of the machine in coaxial relation to define a predetermined air gap between them as by spaced apart metal shims provided in the air gap. While so disposed, I then apply disintegrable material in fluid form in the part of the air gap unoccupied by the metal shims and thereafter cause this material to solidify. This material is compatible with the internal parts of the machine so that upon its subsequent disintegration, the constituents will not have a deleterious effect on the machine components. I then remove the metal shims so that the stator, rotor and shaft are then held together solely by the disintegrable material which accurately controls the uniformity of the air gap previously established by the metal shims.

A pair of bearing supports, which each include an imperforate wall mounting a bearing, are arranged in journaled relation with the shaft, with a section of the wall disposed adjacent the stator in spaced, unsupported relation, and unhardened adhesive material is formed in a layer between the stator and the adjacent wall section. The shaft functions to provide proper alignment of the bearings without interference from the other components of the machine. After the adhesive material is hardened or cured as by the application of heat, I destroy the disintegrable material in the air gap to release the rotor and stator for relative rotation. In this way, in spite of the fact that the machine may be of the totally enclosed type, I have provided an accurately controlled air gap and true alignment between the shaft and cooperating journal bearings by a relatively inexpensive procedure suitable for use in the mass production manufacture of dynamoelectric machines.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 1 is a side view partially in cross section revealing one preferred step in the illustrated embodiment of my invention in which a rotor and shaft assembly and one end shield or bearing support are positioned on a fixture;

FIG. 2 is a view similar to that of FIG. 1 illustrating the next step in the preferred method of my invention with the stator positioned around the rotor and shim means temporarily establishing a circumferentially uniform air gap while decomposable material in fluid form is being applied into the portion of the air gap not occupied by the shim means;

FIG. 3 is an enlarged plan view of the motor components seen in FIG. 2 after the fluid decomposable material has been solidified in the air gap to maintain the stator, rotor and shaft in the already established fixed relation and the shim means have been removed, the size of the air gap being exaggerated in order to illustrate detail;

FIG. 4 is a side view in cross section of the motor components arranged in a final assembled relation, with the decomposable material controlling the air gap dimensions while maintaining the stator, rotor, and shaft in the fixed relation; and FIG. 5 shows one manner in which the motor components shown in FIG. 4 may be fixedly secured together in the desired relation before the material in the air gap is disintegrated.

Referring now to the drawing in more detail, FIGS. 1 through 5 illustrate the preferred method of my invention employed in the manufacture of an electric motor of the totally enclosed type. Initially a motor end shield 11 is placed on a fixture 12 in the manner shown in FIG. 1. The end shield of the exemplification comprises a generally cup-shaped imperforate bearing support member 13, formed from sheet metal material having an axially extending wall section 14 and a radial wall section 14 which is provided a central aperture 16, and a bearing 17 of a porous sleeve type having one end 18 accommodated in aperture 16. The bearing is secured to wall section 14 by any suitable manner, such as by staking or the like. A bearing and shaft lubricating reservoir in the form of a cylindrical oil impregnated felt pad 19 surrounds and is in intimate contact with the outer longitudinal surface of bearing 17 to furnish lubrication through the body of the bearing to its journal surface 20. Pad 19 may be enclosed within a cup 21 which has a peripheral edge 22 rigidly attached to the inner wall of support member 13 by bonding material 23 such as an epoxy organic thermo-setting resin known as EA-200, commercially available from Co-polymers Chemicals, Inc. of Livonia, Michigan. A flange 24 of cup 21 engages bearing 17 near its inner end 25 for supporting that end of the bearing adjacent face 26 formed as a stationary thrust receiving surface.

With respect to the illustrated assembly fixture, it consists of a generally cylindrical cast base 31 having a raised block or stud portion 32 provided with a central, longitudinally extending shaft accommodating hole 33 and a threaded screw receiving hole 34 in axial alignment with hole 33.

With end shield 11 positioned on the assembly fixture such that the face of staked bearing end 18 rests on the block 32 of the fixture, a rotor and shaft assembly 40, including a shaft 41 and a rotor 42 secured thereto, is assembled with output end 43 of the shaft extending into fixture hole 33 and in abutting engagement with adjustable screw 35 threadedly received by fixture hole 34. Rotor 42 of the exemplification is a standard induction type having a magnetic laminated core 44 furnished with an accurately finished periphery and a squirrel-cage winding conventionally formed of a plurality of conductors 45 integrally joined at each end by end rings 46. Each end ring may mount a standard thrust transmitting washer 47 for rotation with assembly 40. Thus, it can be seen from FIG. 1 that if the components are arranged with the axis of the shaft in a vertical direction, it is convenient to regulate the amount of shaft end play between the lower thrust transmitting washer 47 (as viewed in the drawing) and the thrust receiving face 26 of the bearing. An adjustment of screw 35 moves rotor and shaft assembly 40 a predetermined distance relative to bearing 17.

In order to establish a temporarily fixed, uniform air gap (indicated generally by numeral 48 in FIG. 2) which is defined between rotor core 44 and stator 49 of the stationary member, I prefer to use a metal shim assembly 50 shown in FIGS. 1 and 2. It comprises a cast iron cylinder 51 provided with four angularly and equally spaced apart axial slots 52 in which a corresponding number of identical flexible steel shims 53 are secured, each shim having a cross section thickness approximating the radial dimension of the air gap. Preferably, the distance between diametrically opposed slots is slightly less than the finished outer diameter of the rotor core to assist in the assembly of the stator with the rotor. A central hole 54 in the lower end of cylinder 51 fits over the end of the shaft, allowing the shims to extend downwardly to a point at least beyond the axial center of rotor core 44.

It should be observed at this time from FIG. 2 that the stator of the exemplification is conventionally formed with an annular laminated core 56 of magnetic material which carries excitation windings 57 in the usual and well known manner. Prior to its assembly with the rotor, structural adhesive bonding material 61 in an unhardened or plastic state may be circumferentially applied to stator perimeter 58 to form an unhardened annular layer. For convenience, material 61 may be of the same type employed for bonding material 23 previously mentioned.

Stator 49 is lowered or slid downwardly over shim assembly 50, which has a smaller transverse dimension than the diameter of stator bore to permit this action, until the stator and rotor assume the relationship most clearly seen in FIG. 2. Wall section 14 of bearing support 13 is in telescoping and spaced, but unsupported, relation relative to stator perimeter 58, with the unhardened bonding material 61 filling this space. Of course, if desired, unhardened material 61 could be applied by any suitable means, such as through a nozzle (not shown) to the space adjacent wall section 14 after the rotor and stator have been assembled together as described above.

Now then, by an important aspect in my procedure of manufacture, while the rotor and stator are held firmly together in the predetermined temporary relation, e.g., with the uniform air gap established, I furnish a disintegrable or decomposable material 65 in holding engagement with the rotor and stator to maintain such relationship for the remaining steps of manufacture. In the illustrated embodiment, I apply disintegrable material 65 in fluid form in the space in the air gap unoccupied by the metal shims 53. Preferably, material 65 is chosen to have predictable melting and decomposition or disintegration points or temperature ranges within narrow limits, and should be stable, having the characteristics of staying completely solid without experiencing a physical reduction in size or volume until it attains the temperature of these points. In the present embodiment, the points should also be high enough to permit adequate time for the epoxy resin to substantially set up and harden, yet low enough so that the temperature sensitive parts of the motor will not be deleteriously affected.

With the foregoing characteristics, material 65, when solidified in the air gap, permits the stator and rotor to be pre-assembled as a sub-assembly unit, if desired. Material 65, unlike continuously subliming material or that which gradually becomes plastic with progressive increase in temperature, will indefinitely preserve the already established relationship of the parts without variance until the sub-assembly is actually used with the other motor components. It should also be compatible with the surfaces of the rotor and stator so that the solidified material will not cause corrosion. Thus, the sub-assembly may be safely stored without any adverse effects on the established relation of the motor components. Moreover, for the fabrication of totally enclosed machines where the constituents of the holding material cannot be readily removed from the confines of the machine frame without considerable difficulty, it is desirable that these constituents and by-products be compatible with the interior machine components. In other words, the constituents should not deleteriously affect the quality of the motor parts, e.g. attacking winding insulation.

In actual practice, I have found ammonium sulfamate ($NH_4SO_3NH_2$) quite satisfactory as material 65. Ammonium sulfamate melts at approximately 131° C. and has a destruction or decomposition temperature somewhat higher, in the range of 160° C. Further, it is very stable, being a solid of constant volume at room temperature, and does not begin to soften until its temperature has been raised to the melting point where it suddenly turns to a fluid. As a fluid, material 65 starts to run out of the air gap just prior to its decomposition or break down into its constituents of ammonia ($NH_3$) and sulfur trioxide ($SO_3$), the latter ultimately changing to the more stable sulfur dioxide ($SO_2$).

Referring once again to the steps of assembly and in particular to FIG. 2, material 65 may be deposited in a heated, fluid state or a thin film through nozzle 66 at the top of the air gap and permitted to flow down between and around shims 53 for the circumferential length of the air gap. Heat is conducted away from the material by the rotor and stator, which have temperatures below that of the heated fluid and act as heat sinks to reduce the temperature of the material 65, solidifying it in a matter of a few seconds. Shim assembly 50 is removed, as by a U-shaped bar (not shown) adapted to fit into circumferential groove 55 of cylinder 51. Once this has been accomplished, the motor components are in the relative positions seen in FIG. 3, with solidified material 65 maintaining the relationship of parts previously established by shims 53.

Thereafter, a second end shield 11a, (FIG. 4), identical with the one already described except that end shield 11a contains mounting studs 68, is slid over the upper end of the shaft until its wall section 14 is adjacent but in spaced telescoping unsupported relation to stator perimeter 58, with bonding material 61 arranged in the space. It will be seen from FIG. 4 that the motor components are now in a final assembled form in which the weight of the components will not destroy their already established relationship, that is, with the air gap accurately provided and the shaft journal surfaces guiding the bearings into the properly aligned (both axially and with the shaft) positions.

Finally, I unite the bearing supports rigidly to the stator and substantially destroy solidified holding material 65. This may be readily accomplished, for instance, by a predetermined addition of heat to the motor of the present embodiment as it passes through a kiln 70 on a conveyer 71 as revealed in FIG. 5. Any addition of heat, of course, must be such that the temperature sensitive parts of the motor, such as winding insulation, are not adversely affected. In order to illustrate this procedure more clearly, I will use the specific compositions previously given as examples for adhesive bonding materials 23 and 61 and disintegrable material 65, that is, epoxy resin EA 200 and ammonium sulfamate. In actual practice, the temperature of the epoxy resin was raised to approximately 105° C. from room temperature where the epoxy resin hardened or set up sufficiently to retain bearing supports 13 in a fixed relation to the stator, rotor, and shaft. Further, application of heat continued to cure the resin while raising the temperature of the ammonium sulfamate to its melting and decomposition temperatures at which time it broke down or decomposed into ammonia and sulfur trioxide constituents, thereby releasing the rotor and shaft for relative rotation with respect to the stator and bearings. The relative high temperature at which the disintegrable material changes from a solid, permits a substantial cure to be provided for the epoxy resin. Since the boiling points of ammonia and sulfur dioxide are minus 33.35° C. and minus 10° C. respectively, both are gases under normal operating conditions of a motor.

It will be recognized from the foregoing disclosure that the assembly procedure of the present invention not only provides an accurately controlled air gap between the rotor and stator but in addition achieves alignment of the bearings and the shaft even though the machine is of the totally enclosed type. Furthermore, the process is relatively simple to practice, low in cost, and is adaptable for use in the mass production manufacture of a uniformly high quality machine.

While in accordance with the Patent Statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A method of assembling a dynamoelectric machine having a stationary member including a stator, a rotatable assembly including a rotor rotatable with a shaft, and rotor supporting means including at least one bearing rotatably supporting the shaft; establishing a predetermined relation between the stationary member and rotatable assembly by spacer means in engagement with said member and said assembly and with the shaft extending into the bearing; applying in fluid form disintegrable holding material, which is stable at room temperature, in between said stator and rotatable assembly to preserve said established predetermined relation; solidifying said disintegrable holding material, while maintaining said established predetermined relation by the disintegrable holding material having a constant volume at room temperature; removing said spacer means; rigidly attaching said rotor supporting means and stationary member together in a fixed relation; and disintegrating the holding material thereby releasing the rotor and shaft for rotation relative to the stationary member and bearing.

2. A method of assembling a dynamoelectric machine having a stationary member including a stator, a rotatable assembly including a rotor rotatable with a shaft, and rotor supporting means including at least one bearing rotatably supporting the shaft; establishing a predetermined relation between the stationary member and rotatable assembly by spacer means in engagement with said member and assembly and with the shaft extending into the bearing; applying ammonium sulfamate in fluid form between said stationary member and said rotatable assembly without changing said established predetermined relation; solidifying said ammonium sulfamate while maintaining said established predetermined relation by solidified ammonium sulfamate having a predictable disintegration temperature; removing said spacer means; rigidly attaching said rotor supporting means and stationary member together in a fixed relation; and raising the temperature of said ammonium sulfamate to its disintegration temperature thereby breaking it down into gaseous constituents whereby the rotor and shaft are released for rotation relative to the stationary member and bearing.

3. A method of assembling a dynamoelectric machine having a stationary member including a stator core, and a rotatable assembly including a shaft and rotor, and a pair of end shields each having a bearing for rotatably supporting the shaft; establishing a uniform air gap between the stator core and the rotatable assembly by placing a number of angularly spaced apart metal shims in the air gap; applying disintegrable material into the space of the air gap unoccupied by the metal shims, with said material having a predictable disintegration temperature; removing said metal shims from the air gap while said disintegrable material preserves the uniformity of the air gap; fixedly attaching said end shields to said stationary member, with the shaft extending into the bearing; and raising the temperature of said disintegrable material to its disintegration temperature but below the deleterious temperature of the temperature sensitive machine components to decompose said material, thereby releasing the rotor and shaft for rotation relative to the stationary member and bearing and building a uniform air gap and aligned bearing and shaft parts into the machine.

4. A method of assembling a totally enclosed dynamoelectric machine having a stationary member including a stator core, and a rotatable assembly including a shaft and rotor, and a pair of imperforate end shields attached to said stationary member by hardened adhesive material and each having a bearing for rotatably supporting the shaft; establishing a predetermined, dimensioned air gap between the stator core and the rotatable assembly by placing a number of angularly spaced apart metal shims in the air gap; applying decomposable material in fluid form into the space of the air gap unoccupied by the metal shims, with said material having a predictable decomposition temperature and being compatible with the internal component parts of the machine; solidifying said decomposable material in the air gap; removing said metal shims from the air gap as said solidified decomposable material preserves the predetermined dimensions of the air gap; hardening the adhesive material applied in an unhardened state between each end shield and said stationary member, with the shaft extending into the bearing while said solidified decomposable material continues to preserve the predetermined dimensions of the air gap; and raising the temperature of said decomposable material to its decomposable temperature but below the deleterious temperature of the temperature sensitive machine components to break down said decomposable material, thereby releasing the rotor and shaft for rotation relative to the stationary member and bearing and building a predetermined, dimensioned air gap and aligned bearing and shaft components into the machine.

5. A method of assembling a totally enclosed dynamoelectric machine having a stationary member including a stator core, and a rotatable assembly including a shaft and rotor, and a pair of imperforate end shields each having a bearing for rotatably supporting the shaft; establishing a uniform air gap between the stator core and the rotatable assembly by placing a number of angularly spaced apart metal shims in the air gap; applying decomposable material in fluid form into the space of the air gap unoccupied by the metal shims, with said material having predictable melting and decomposable points and being compatible with the internal component parts of the machine; solidifying said decomposable material in the air gap to engage said stator core and rotatable assembly; removing said metal shims from the air gap; fixedly attaching said end shield to said stationary member with the shaft extending into the bearing while said solidified decomposable material is in the air gap; and raising the temperature of said decomposable material above its melting point to its decomposition temperature but below the deleterious temperature of the temperature sensitive machine components, to decompose said material thereby releasing the rotor and shaft for rotation relative to the stationary member and bearing and building a uniform air gap and aligned bearing and shaft components into the machine.

References Cited by the Examiner
UNITED STATES PATENTS

| | | | |
|---|---|---|---|
| 228,947 | 6/1880 | Seaman | 29—423 |
| 2,423,750 | 7/1947 | Benson | 29—155.5 |
| 3,002,261 | 10/1961 | Avilla et al. | 29—155.5 |
| 3,098,287 | 7/1963 | Buchsbaum | 29—155.5 |

JOHN F. CAMPBELL, *Primary Examiner.*

WHITMORE A. WILTZ, J. W. BOCK, R. W. CHURCH, *Examiners.*